(12) United States Patent
Rafi

(10) Patent No.: US 9,496,906 B2
(45) Date of Patent: Nov. 15, 2016

(54) RECEIVER WITH WIDE GAIN RANGE

(71) Applicant: Silicon Laboratories Inc., Austin, TX (US)

(72) Inventor: Aslamali A. Rafi, Austin, TX (US)

(73) Assignee: SILICON LABORATORIES, INC., Austin, TX (US)

( * ) Notice: Subject to any disclaimer, the term of this patent is extended or adjusted under 35 U.S.C. 154(b) by 0 days.

(21) Appl. No.: 14/625,324

(22) Filed: Feb. 18, 2015

(65) Prior Publication Data
US 2016/0241285 A1 Aug. 18, 2016

(51) Int. Cl.
*H04B 1/06* (2006.01)
*H04B 7/00* (2006.01)
*H04B 1/12* (2006.01)

(52) U.S. Cl.
CPC ..................... *H04B 1/123* (2013.01)

(58) Field of Classification Search
CPC .. H04B 1/16; H04B 2001/307; H04B 1/123; H03G 3/20; H03G 3/30
USPC ......... 455/232.1, 234.1, 249.1, 250.1, 251.1, 455/252.1, 253.2, 324
See application file for complete search history.

(56) References Cited

U.S. PATENT DOCUMENTS

| 7,081,796 | B2 | 7/2006 | Krone |
| 7,355,476 | B2 | 4/2008 | Kasha et al. |
| 7,973,603 | B2 | 7/2011 | Kammula et al. |
| 8,242,844 | B2 | 8/2012 | Rafi |
| 2003/0132814 | A1 | 7/2003 | Nyberg |
| 2003/0207674 | A1 | 11/2003 | Hughes |
| 2007/0004359 | A1 | 1/2007 | Srinivasan et al. |
| 2008/0224770 | A1* | 9/2008 | Kim ........................ H03F 3/68 330/51 |
| 2009/0261899 | A1* | 10/2009 | Gomez ..................... H03G 5/28 330/2 |
| 2010/0315164 | A1* | 12/2010 | Vakilian ................. H03F 1/086 330/254 |
| 2011/0294448 | A1 | 12/2011 | Vauhkonen |
| 2012/0025911 | A1* | 2/2012 | Zhao ....................... H03F 1/223 330/254 |
| 2012/0182430 | A1* | 7/2012 | Birkett ................. H04N 5/4401 348/180 |
| 2014/0335808 | A1* | 11/2014 | Pullela ..................... H03F 3/19 455/188.1 |
| 2015/0222305 | A1* | 8/2015 | May ..................... H04B 1/1018 455/63.1 |

OTHER PUBLICATIONS

Avago Technologies, "A Low-Cost Surface Mount PIN Diode Pi Attenuator," Application Note 1048, Jul. 13, 2010, 8 pages.
Actions on Merits for Copending U.S. Appl. No. 14/057,404, filed Oct. 18, 2013.

* cited by examiner

*Primary Examiner* — Nguyen Vo
(74) *Attorney, Agent, or Firm* — Polansky & Associates, P.L.L.C.

(57) ABSTRACT

A receiver comprises a passive gain stage having an input to receive an in-going radio frequency (RF) signal and a gain control signal to produce an adjusted in-going RF signal, a sliced LNA stage comprising a plurality of LNAs coupled to receive the in-going RF signal. Each LNA includes an adjustable source degeneration circuit for receiving a plurality of gain selection and control signals and an output port to produce an amplified in-going RF signal. A mixer is coupled to receive at least one of the amplified in-going RF signals produced by the sliced LNA stage and is configured to produce a converted signal at another frequency. A PGA is coupled to receive the down-converted signal and produces an amplified in-going signal.

24 Claims, 4 Drawing Sheets

RECEIVER WITH WIDE GAIN RANGE

CROSS REFERENCE TO RELATED, COPENDING APPLICATION

Related subject matter is found in a co-pending application having application Ser. No. 14/057,404, entitled HIGH PERFORMANCE, LOW COST RECEIVER FRONT END, invented by Navin Harwalkar, Tim Stroud, and Dan Kasha, filed Oct. 18, 2013, and assigned to the assignee hereof.

FIELD OF THE DISCLOSURE

The present disclosure relates generally to radio frequency (RF) receivers and transceivers, and more particularly to front-end circuits for RF receivers.

BACKGROUND

RF receivers are used in a variety of modern electronics, such as smart phones, digital radios, modems, routers, printers, and Internet gateways. FIG. 1 is a functional block diagram of an RF receiver constructed according to the prior art. As a may be seen, a receiver 10 includes a transformer in a balanced/unbalanced (BALUN 12) configuration in which the first terminal of a first port receives a single-ended receive signal from an antenna 14, and a second port is connected to produce the in-going RF signal to a low noise amplifier (LNA 16) that, in turn, produces an amplified in-going RF signal to a mixer or down conversion block 18 (generally, a mixing stage). Down conversion block 18 produces a frequency down converted signal to a filtering/gain block 20 that filters the received signal and provides additional amplification to generate a filtered and amplified signal to an analog to digital converter (ADC) 22 that produces a digital representation of the filtered and amplified signal to a processor 24 for processing.

For example, receiver 10 can be part of a transceiver that is used to support the transmission and reception of communication signals according to one or more of a variety of communication standards for relatively short communication distances, including near-field communication (NFC) having a distance of about 10 centimeters, personal area networks operative from 10 to 100 meters using a private as well as standardized communication protocols such as "ZigBee", "Bluetooth" and Bluetooth low energy (BTLE), and wireless local area networks protocols including the various versions of I.E.E.E. 802.11 communication protocols for "WiFi" communications having a greater maximum distance. While WiFi range varies based on structural conditions and interference, under ideal conditions, a WiFi range of over 300 meters are possible.

These various standards are designed for particular purposes and generally have different power and signaling requirements. However many electronic products now support communications according to multiple standards, and provide separate circuitry for each standard at an increased product cost. Additionally, utilizing multiple transceivers in one device leads to shorter battery life. Accordingly, one design challenge is to design and build a low cost, reliable receiver using a common antenna that accommodates different receive signal strengths.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

In one form, a receiver as described herein includes a passive gain stage, a sliced LNA stage, a mixer, and a programmable gain amplifier (PGA). The passive gain stage has an input to receive an in-going radio frequency (RF) signal and a gain control signal to produce a gain adjusted in-going RF signal. The sliced LNA stage comprises a plurality of low noise amplifiers (LNAs) coupled to receive the gain adjusted in-going RF signal. Each LNA further includes an adjustable source degeneration circuit wherein each LNA further includes a port for receiving a plurality of gain selection and control signals and an output port to produce an amplified in-going RF signal. The mixer comprises an input coupled to receive at least one of the amplified in-going RF signals produced by the sliced LNA stage, wherein the mixer is configured to produce a converted signal at another frequency. The PGA is coupled to receive the converted signal and configured to produce an amplified in-going signal.

Figure 1:
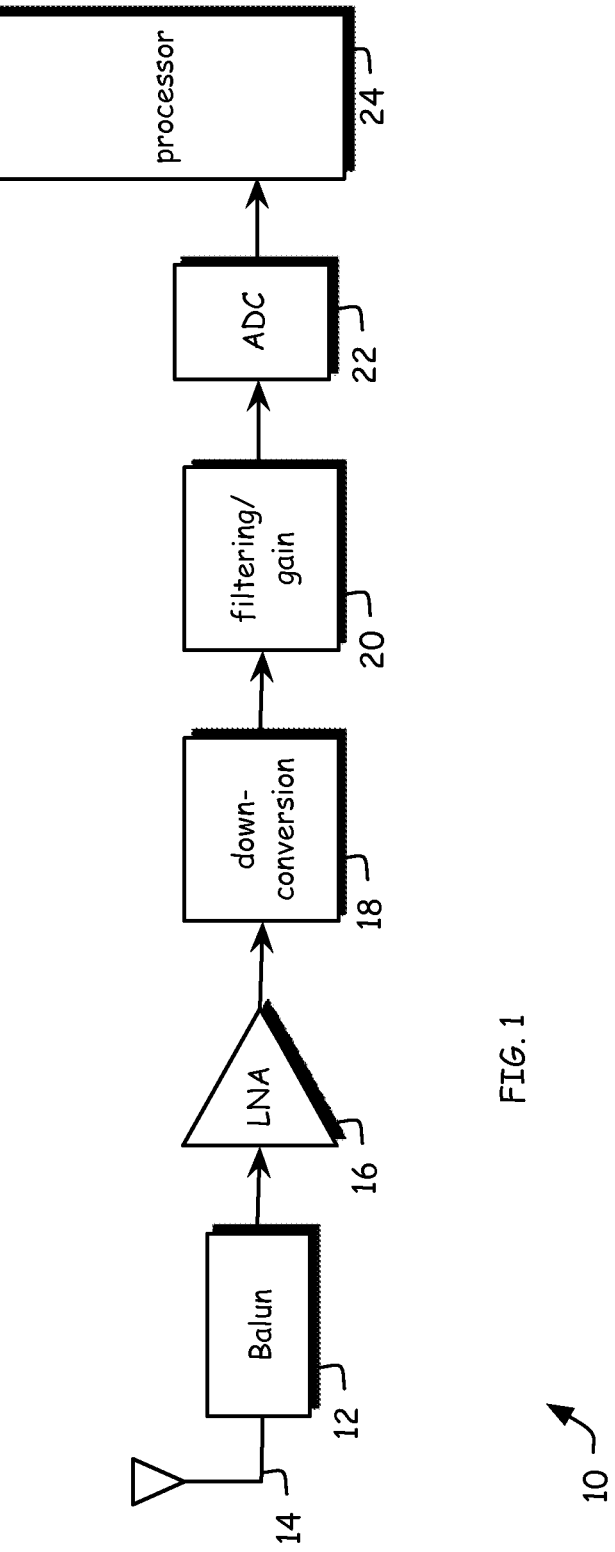
FIG. 1 illustrates, in block diagram form, a receiver front-end circuit known in the prior art.
Figure 2:
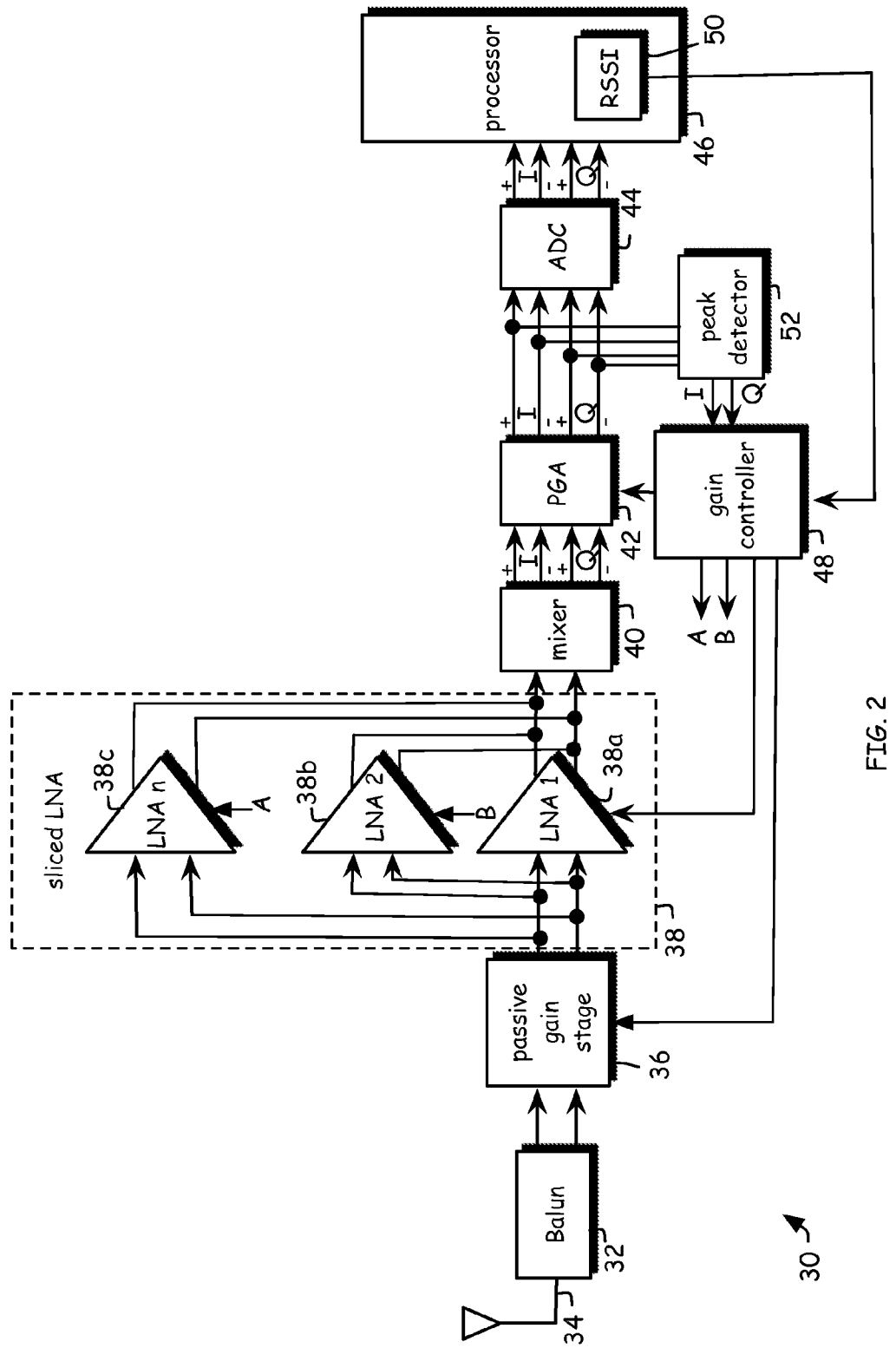
FIG. 2 illustrates, in block diagram form, a receiver according to an embodiment of the present invention.

FIG. 2 illustrates, in block diagram form, a receiver 30 according to an embodiment of the present invention. More specifically, receiver 30 includes a transformer 32 in a balanced/unbalanced configuration ("Balun 32") that receives an ingoing RF signal from an antenna 34. Balun 32 produces a differential in-going RF signal to a passive gain stage 36. A differential gain adjusted in-going RF signal is produced by passive gain stage 36 to sliced LNA stage 38. As may be seen, the differential gain adjusted in-going RF signal is produced to a pair of input terminals of each LNA, such as representative LNAs 38a, 38b and 38c shown in FIG. 2. LNA 38c is labeled "LNA n" in FIG. 2 to represent that "n" number of LNAs may be disposed within sliced LNA 38 and that sliced LNA 38 is not limited to three LNAs. Sliced LNA 38 includes at least two LNAs and can include four or more LNAs in other forms of receiver 30.

Each LNA 38a-38c of sliced LNA 38 produces an amplified in-going RF signal. In the described embodiment, at least one of the LNAs 38a-38c includes source degeneration circuitry with a selectable component to adjust a source degeneration magnitude (amount of source degeneration). In the described embodiment, each of the LNAs 38a-38c includes source degeneration circuitry with a selectable component to adjust a source degeneration magnitude. The amplified in-going RF signal produced by sliced LNA stage 38 is produced to a pair of input terminals of a mixer 40.

Mixer 40 produces differential in-phase (I) and quadrature (Q) components at a changed (or other) frequency to two pairs of input terminals for a programmable gain amplifier (PGA) such as PGA 42. It should be understood that, in a first form, mixer 40 down converts an amplified in-going RF signal to one of an intermediate frequency (IF) or base band (BB) frequency signal for subsequent processing in the receive path.

The mixing stage may comprise one of a different number of forms. In one form, a single mixing stage is used to mix a selected band of the in-going RF to a lower IF for processing by the receive path circuitry. In another form, mixer 40 mixes the selected band of the amplified in-going RF signal to a higher IF for subsequent processing and down-conversion to either an IF or BB signal. This latter form is known as an up-down conversion architecture. For example, the frequency may be increased and then filtered by a high-quality surface acoustic wave (SAW) filter and subsequently down converted to either IF or BB. Any such form for the mixing stage may be utilized in various embodiments of the invention.

PGA 42, in one form, includes a single PGA. In another form, PGA 42 includes a plurality of PGAs connected in series to increase the gain of the in-going RF signal. More specifically, PGA 42 receives the differential I and Q phase components and amplifies the I and Q phase components to produce an amplified in-going signal with differential I and Q phase components to two differential input terminals of an analog-to-digital converter (ADC) 44 that subsequently produces amplified in-going signal with differential I and Q phase components in a digital form to two differential input terminals of processor 46 for subsequent processing. While not shown here, it should be understood that the receive path for receiver 30 may include one or more filters or that even a PGA that includes a filtering function.

In the described embodiment, a gain controller 48 is coupled to receive received signal strength indications (RSSI) from an RSSI block 50 and peak signal values from a peak detector (PD) 52 for the I and Q phase signals produced by the PGA and produces gain and other control signals to passive gain stage 36, each LNA 38a-38c and PGA 42 based on the RSSI and peak signal values. RSSI 50 is a digital RSSI and determines digital signal strength after a digital channelization filter which is not shown here. The RSSI block 50 gives an indication of the received power in the desired RF channel. With respect to passive gain stage 36, gain controller 48 sends control signals to select one or more resistive elements of passive gain stage 36 to adjust the gain of the ingoing RF signals produced to the sliced LNA stage 38. In one embodiment, each selection of resistive elements of passive gain stage 36 results in a 2 decibel (dB) change in gain. With respect to each LNA 38a-38c, the gain control signals select resistive elements of the source degeneration circuitry of the LNAs 38a-38c. In another form not shown here, an additional analog RSSI block may be included to generate a signal strength of an incoming signal. This generated signal strength also is produced to gain controller 48.

In one embodiment, each selection of resistive elements of the source degeneration circuitry (as illustrated in more detail in relation to FIG. 3) results in a 2 decibel (dB) change in gain. With respect to the PGA 42, the gain control signals select, in terms of absolute gain, a gain level setting ranging from +6 dB to +30 dB. It should be understood that gain controller 48 in one form comprises discrete circuitry to generate the gain and control signals, but in other forms may be part of processor 46.

In operation, receiver 30 operates in a receive mode to receive and process in-going RF signals received via antenna 34. The in-going RF signals are input to Balun 32. Balun 32 produces a differential in-going RF signal to passive gain stage 36. Passive gain stage 36 produces a filtered differential gain adjusted in-going RF signal to sliced LNA stage 38 based not only on the differential in-going RF signal, but also on gain/control signals received from gain controller 48.

In the described embodiment, LNA stage 38 comprises "n" LNA stages. Gain controller 48 produces the gain/control signals that select one or more of the LNAs 38a-38c for operation and that specifies a gain setting for the selected LNA(s). The selected LNAs 38a-38c then produce a differential amplified in-going RF signal to a mixer 40 based upon the received differential gain adjusted in-going RF signal and the gain/control signals received from gain controller 48.

Mixer 40 is used to mix the in-going RF signal to another frequency and to produce differential in-phase and quadrature phase components. In one form, the other frequency is one of a baseband (BB) frequency or a lower intermediate frequency (IF). In another form, the other frequency is a higher IF. Mixer 40 produces differential I and Q phase component signals to PGA 42. PGA 42 amplifies the received differential I and Q phase component signals based on the gain/control signal received from gain controller 48. PGA 42 then produces the amplified in-going signal with differential I and Q components to ADC 44 that produces the amplified in-going signal having differential I and Q components in digital form to processor 46 for processing.

In one form, receiver 30 includes a peak detector at the output of PGA 42 and a received signal strength indicator at the output of ADC 44 (not shown in FIG. 2). Gain controller 48 uses peak detector (PD 52) and received signal strength indicator (RSSI 50) blocks to measure the power in the selected band and to adjust the gain of the various gain elements as will be described further below.

Figure 3:
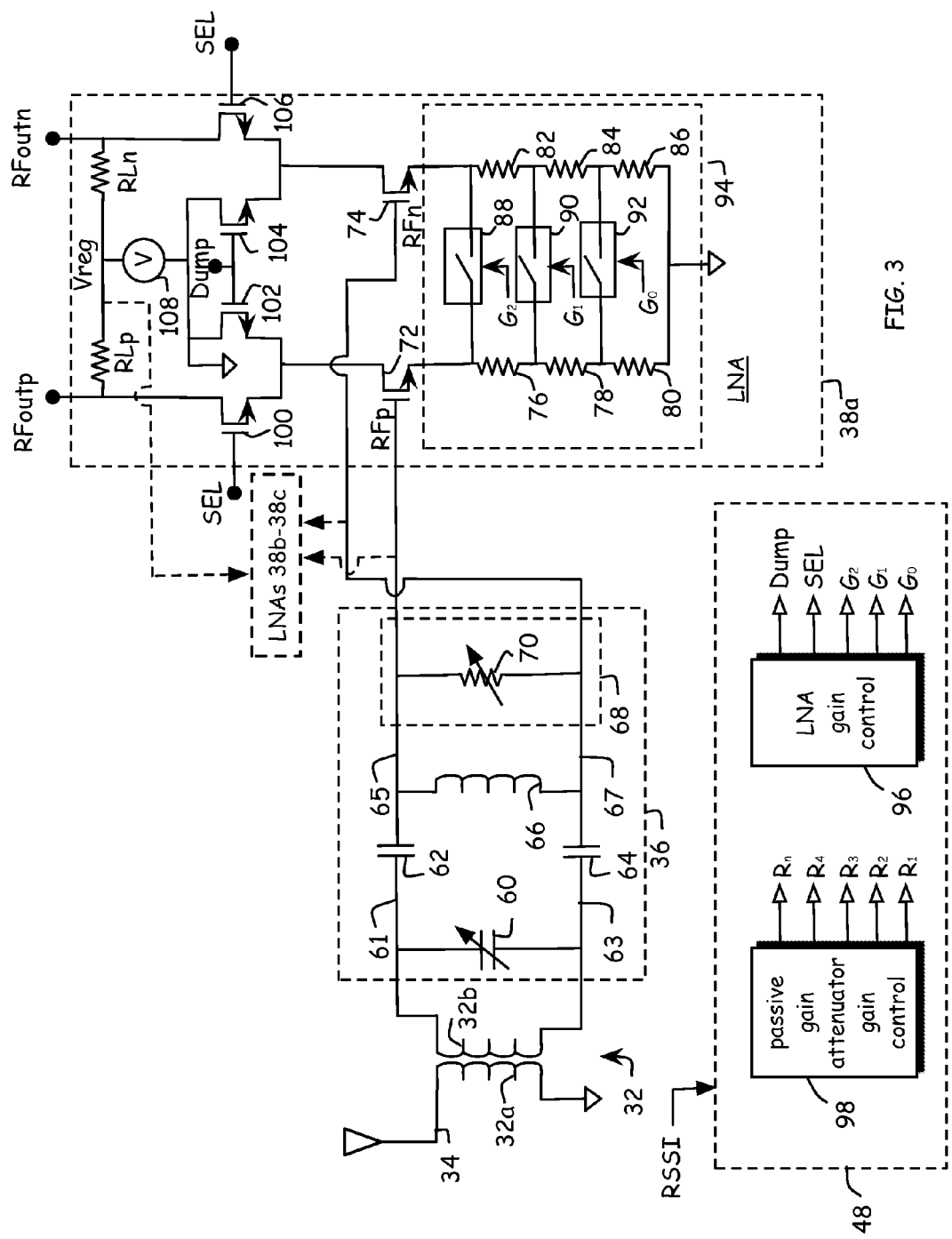
FIG. 3 illustrates partially in block form and partially in schematic form further details of a receiver front end receiving signals having a wide range of input signal strength.

FIG. 3 illustrates partially in block form and partially in schematic form further details of a receiver front end for receiving signals having a wide range of input signal strength. As in FIG. 2, Balun 32 receives an in-going RF. Balun 32 includes primary windings 32a and secondary windings 32b. Secondary windings 32b are coupled to produce a differential in-going RF signal to a passive gain stage 36. The primary windings 32a of Balun 32 include a first terminal connected to antenna 34 and a second terminal connected to ground. The secondary windings include first and second output terminals that produce the differential in-going RF signal and a center tap connected to a ground terminal, not shown here.

Passive gain stage 36 includes first and second input terminals connected to the first and second output terminals of the secondary winding 32b of Balun 32. Passive gain stage 36 further includes first and second output terminals for providing a differential gain adjusted in-going RF signal. Passive gain stage 36 includes a plurality of impedance elements 60, 62, 64, and 66 and a passive gain attenuator 68. In one form, passive gain stage 36 includes capacitive elements 60, 62, and 64 an inductive element 66. Capacitive element 60 is shown as a variable capacitor to support mode changes when the Balun 32 and antenna 34 are used for transmit operations since receiver 30 is actually a part of a transceiver that supports two-way communications, though this aspect is not relevant to understanding the operation of receiver 30 and thus is not shown here. As may be seen, a first terminal of the secondary winding of Balun 32 is connected a first node 61 that is also connected to a first end of capacitive elements 60 and 62 while a second end of the secondary winding of Balun 32 is connected to a second node 63 that is also connected to a second end of capacitive element 60 and a first end of capacitive element 64. The second end of capacitive element 62 is connected to a third node 65 that is also connected to a first end of inductive element 66 and a first end of a passive gain attenuator 68. Passive gain attenuator 68 includes a plurality of selectable resistive elements shown here as a variable resistive element 70. A second end of capacitive element 64 is connected to a fourth node 67 that is also connected to a second end of inductive element 66 and a second end of passive gain attenuator 68.

Node 65 that is connected to the first end of inductive element 66 produces the "plus" output of the passive gain stage 36 ("RFp") while node 67 is connected to the second end of inductive element 66 that produces the "minus" output of the passive gain stage 36 ("RFn"). RFp and RFn are the components of the differential gain adjusted in-going RF signal.

The differential gain adjusted in-going RF signal is produced by the passive gain stage 36 to the input terminals of LNAs 38a-38c. Referring to the circuitry of LNA 38a, a first amplification device 72 includes an input terminal connected to receive RFp from passive gain stage 36 while a second amplification device 74 includes an input terminal connected to receive RFn from passive gain stage 36. In one form, amplification devices 72 and 74 are n-channel MOSFETS. The input terminals are the gate terminals of the MOSFETS (amplification devices 72 and 74).

A source terminal of first amplification device 72 is connected to a first end of a resistive element 76. A second end of resistive element 76 is connected to a first end of resistive element 78. A second end of resistive element 78 is connected to a first end of resistive element 80. A second end of resistive element 80 is connected to ground or circuit common. A source terminal of second amplification device 74 is connected to a first end of a resistive element 82. A second end of resistive element 82 is connected to a first end of resistive element 84. A second end of resistive element 84 is connected to a first end of resistive element 86. A second end of resistive element 86 is connected to ground or circuit common and to the second end of resistive element 80.

As may be also seen, the first ends of resistive elements 76 and 82 are connected to first and second ends, respectively, of a switching element 88. The first ends of resistive elements 78 and 84 are connected to first and second ends, respectively, of a switching element 90. The first ends of resistive elements 80 and 86 are connected to first and second ends, respectively, of a switching element 92. Switching elements 88, 90 and 92 are further connected to receive gain setting signals $G_0$, $G_1$ and $G_2$, respectively. If switching element 88 is selected, there is no attenuation. If switching element 90 is selected, there is 2 dB of attenuation of the amplified signal. If switching element 92 is selected, there is 4 dB of attenuation. If no switching element is selected, there is 6 dB of attenuation because all six resistive elements 76-86 are electrically present to attenuate (or degenerate) the differential ingoing RF signal.

The combination of resistive elements 76-86 and switching elements 88-92 form source degeneration circuitry 94 with selectable gain settings. For maximum gain, an LNA gain control block 96 generates $G_2$ to close switch 88 to connect the first terminals of resistive elements 76 and 82. For a first attenuated gain level, LNA gain control block 96 generates $G_1$ to close switch 90 to connect the first terminals of resistive elements 78 and 84. For a second attenuated gain level, LNA gain control block 96 generates $G_0$ to close switch 92 to connect the first terminals of resistive elements 80 and 86. For a third attenuated gain level, LNA gain control block 96 generates $G_0$, $G_1$ and $G_2$ to leave switches 88, 90 and 92 in an open state.

In the illustrated embodiment, the resistive elements are chosen to produce 2 dB of attenuation steps for the four gain levels (no attenuation, +2 dB, +4 dB and +6 dB of attenuation). Similarly, a passive gain attenuator gain control 98 of gain controller 48 generates gain control signals for the passive gain attenuator 68. More specifically, each of the gain control signals $R_1$-$R_n$ selects a resistive element that singly or when combined with at least one other resistive element causes the gain of the passive gain stage to be attenuated by 2 dB. In the described embodiment n=12, meaning there are 12 selectable resistive elements to create a maximum amount of attenuation of 24 dB.

The third terminal of the first and second amplification devices 72 and 74 are each connected to switching circuitry used to select or deselect the LNA from operation. In the form as shown, a drain terminal of MOSFET 72 is connected to the source terminals of MOSFETs 100 and 102. The gate terminal of MOSFET 100 is connected to receive a SEL signal that turns MOSFET 100 into an on state to produce $RF_{outp}$. Similarly, a drain terminal of MOSFET 74 is connected to the source terminals of MOSFETs 104 and 106. The gate terminal of MOSFET 106 is connected to receive the SEL signal that turns MOSFET 106 into an on state to produce $RF_{outn}$. As may further be seen, the gate terminals of MOSFETs 102 and 104 are commonly connected to receive a DUMP signal that couples the drain terminals of MOSFETs 72 and 74 to circuit common or ground when the DUMP signal is asserted. In the described form, the DUMP and SEL signals are logically inversed to either turn off the LNA or select and turn the LNA on, respectively. In the present form, every LNA is similarly configured. In an alternative form, the LNAs may have differing configurations and associated operational logic.

As may also be seen, load resistors labeled as RLp and RLn each have a first terminal coupled to the drains of transistors 100 and 106 conducting signals RFoutp and RFoutn, respectively, and a second terminal coupled to a node labeled Vreg. Node Vreg is further coupled to a voltage source 108 labeled as "V". The voltage source 108 is adjusted according the number of LNA slices that are selected such that the common-mode voltage at RFoutp and RFoutn is independent of the gain of the LNA. This will cover the case when the LNA is a transconductance LNA (as shown in FIG. 3) that drives a resistive load. It should also be noted that each of LNAs 38b and 38c are similarly connected to Vreg as shown by the dashed line that extends from Vreg to LNAs 38b and 38c.

In operation, an in-going RF signal received at antenna 34 is produced to the primary windings 32a of transformer 32. The secondary windings 32b of transformer (Balun) 32 produce a differential in-going RF signal to passive gain circuit 36A passive gain attenuator gain control block generates control signals to adjust a total resistive value that results from the selection of a plurality of resistive elements of passive gain attenuator 68. In one form, passive gain attenuator includes 12 selectable resistive elements that are sized to attenuate the gain adjusted differential in-going RF signal in 2 dB increments. Accordingly, the in-going RF signal produced by the passive gain block may selectively vary by a range of 24 dB.

The output of the passive gain stage 36 is produced to a plurality of LNAs 38a-38c of a sliced LNA (as shown in FIG. 2). The gain adjusted in-going RF signal has two components RFp and RFn that are produced to the gate terminals of a pair of the input MOSFETs of each LNA. LNA gain control block 96 generates SEL and DUMP control signals to turn on or off each of the plurality of LNAs 38a-38c. Stated differently, the SEL control signal is produced to one or more selected LNAs and the DUMP signal is produced to the non-selected LNAs.

The input MOSFETs of the selected LNA(s) cause a corresponding current to flow through the MOSFET channel to provide amplification for the received RF signal (RFp or RFn, respectively). LNA gain control 96 also generates control signals $G_0$, $G_1$ and $G_2$ to switching elements 88, 90 and 92 to select a desired level of attenuation, again in 2 dB increments. A signal may be produced from the LNA that is not attenuated, or that is attenuated by 2 dB, 4 dB or 6 dB. When an LNA receives the SEL signal, a switching element connects the drain of the amplifying MOSFET to an output of the LNA.

In terms of total gain control, therefore, passive gain stage 36 generates 24 dB of gain range that may be attenuated in 2 dB increments to provide an absolute gain from −10 dB to +14 dB. The sliced LNA stage and mixer may produce a maximum absolute gain of +15 dB and a minimum gain of −3 dB to create a gain range of 18 dB. The selected LNA(s) generates gain that may be attenuated by up to 6 dB, again in 2 dB increments. Finally, as described in relation to FIG. 2, the PGA of the receiver is configured to produce a gain in the range of +6 dB to +30 dB based on programming and/or control signals received from gain controller 38 to define a gain range of 24 dB. The gain steps for the PGA, like the passive gain attenuator and the LNAs, are 2 dB gain steps. The total selectable gain range, therefore, is 66 dB for a circuit having the form described herein. The specific gain steps and number of gain steps may readily be modified and still fall within the scope of the teachings herein.

According to these capabilities, an exemplary receiver can be built to operate with either the Zigbee standard or the BTLE standard. Such a receiver is required to operate with a large range of input signal strengths, from −100 dBm (i.e. decibels with a reference level of one milliwatt) to +10 dBm. With this signal range, receiver 30 is able to provide about 66 dB of gain range and up to about +60 dB of absolute gain, which provides good performance for both standards. By providing a significant portion of the gain range using a passive gain/attenuator stage, it provides low power consumption. Moreover receiver 30 is able to provide the enhanced gain range of 66 dB and the absolute gain of +60 dB by providing four different gain/attenuation settings (or "knobs"), including a source degeneration knob for each LNA of sliced LNA stage 38. Moreover, by providing 24 dB of gain range using passive attenuation, receiver 10 maintains low power consumption compared to a receiver using only active gain stages. A summary of various gains provided by each gain stage is shown in TABLE I below:

TABLE I

| | Max. Gain | Min. Gain | Gain range | Gain step size |
|---|---|---|---|---|
| Balun 32/passive gain stage 36 | +14 dB | −10 dB | +24 dB | 2 dB |
| LNA 38/ mixer 40 | +15 dB | −3 dB | +18 dB | 2 dB |
| PGA 42 | +30 dB | +6 dB | +24 dB | 2 dB |
| TOTAL | +60 dB | −7 dB | +66 dB | |

In one particular example, gain controller 48 allocates the gains using the four knobs as follows. Gain controller 48 starts by assuming that the RF signal is at the weakest level, and then starts reducing the gain until the gain measured by the peak detector and RSSI blocks, such as PD 52 and RSSI 50 of FIG. 2, is at a desired level. Gain controller 48 starts by reducing the gain of PGA 42 in 2 dB steps. By backing off the PGA gain first, receiver 30 improves noise figure over the gain range by about 2.5 dB compared to sequences in which the PGA gain reduction comes later. When it has reduced the gain of PGA 42 to the lowest amount, it then reduces gain further in 2 dB steps using the source degeneration resistors in LNA 38. When it has reduced the gain of LNA 38 to the lowest amount using the source degeneration resistors, then it reduces gain further in 2 dB steps using LNA slicing in LNA 38. When is has reduced the gain of LNA 38 to the lowest amount using LNA slicing, it reduces the gain further using passive gain attenuator stage 36. This sequence has the advantage that the linearity of LNA 38 increases as source degeneration is increased, so that linearity is improved over most of the gain range of receiver 30 using the extra source degeneration gain knob. However in other embodiments, the position of the source degeneration knob in the sequence can be different based on particular system considerations.

Figure 4:
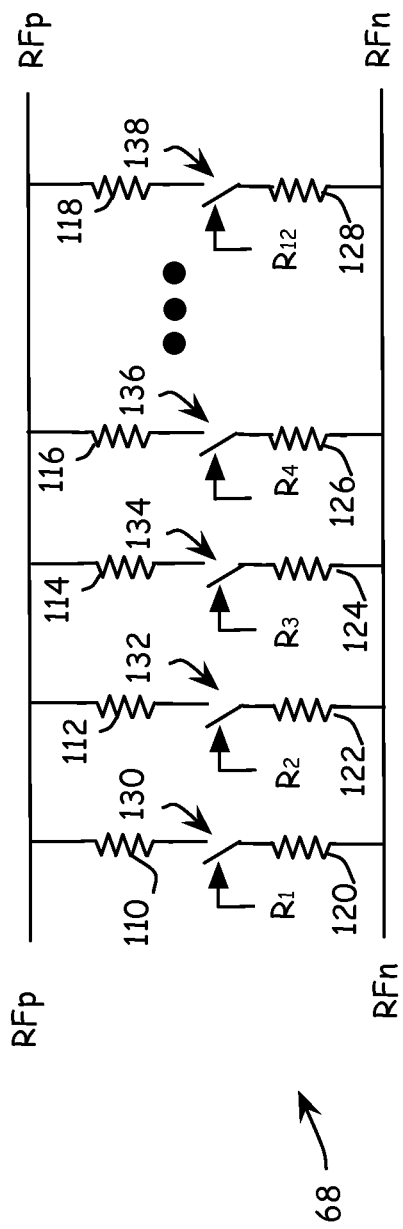
FIG. 4 illustrates in schematic form a passive gain attenuator used in the passive gain stage of the front end circuitry of the receiver of FIG. 3.

FIG. 4 illustrates in schematic form a passive gain attenuator used in the passive gain stage of the front end circuitry of the receiver. As described previously, a differential in-going amplified RF signal is presented to the passive gain attenuator 68 from the LNA gain stage. Generally, the passive gain attenuator 68 attenuates gain in 2 dB increments according to received gain control signals from gain controller 48 as described in relation to FIGS. 2 and 3.

In the described form, the RFp differential component of the in-going amplified signal is conducted on a first terminal of each of resistive elements 110-118. Similarly, the RFn differential component of the in-going amplified signal is conducted on a second terminal of each of resistive elements 120-128. Gain control signals labeled $R_1$-$R_{12}$ are presented to respective switching elements 130-138 to selectively open or close any combination of the switching elements 130-138. For simplicity, only 6 representative parallel resistive paths are shown here though it should be understood that the described embodiment includes 12 parallel resistive paths. Based on utilized resistive values, the gain controller selects combinations of resistive elements to be connected in parallel to attenuate gain in 2 dB gain steps. Further, in one embodiment, each of the switching elements 130-138 comprises a MOSFET wherein the gain control selection signal is received at a gate terminal to activate the MOSFET to close the switching element, and the gain control signals are thermometer coded.

Figure 5:
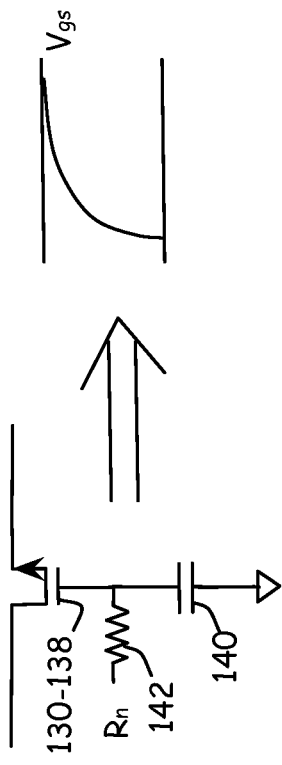
FIG. 5 illustrates in schematic form a functional representation of a passive gain attenuator switch used within the passive gain attenuator of FIG. 4.

FIG. 5 illustrates in schematic form a functional representation of a passive gain attenuator switch used within the passive gain attenuator. One aspect illustrated in FIG. 5 is that the switching that occurs within the passive attenuator switching elements (switches) in a gradual manner illustrated as a logarithmic type response. Such a response may be generated via gradual transition circuitry configured to gradually apply an asserted signal to reduce noise spurs within the receiver. In the described embodiment of such gradual transition circuitry, a capacitive element 140 is connected with a resistive element 142 such that when a gate activation voltage (the asserted signal) is generated, the capacitive and resistive elements jointly allow the signal to be asserted gradually and smoothly to avoid down stream spurs, spikes or noise in the in-going signal that is being processed. In an alternative form, the signal $R_1$-$R_{12}$ may be applied in a gradual form to achieve a response similar to that shown in FIG. 5 via logic formed within the gain controller 48 without requiring a combination of resistive elements 142 and capacitive elements 140 be connected to the gate of the MOSFET. The asserted signal, in this case, is a gate-to-source voltage intended to turn the MOSFET device on to select a corresponding resistive element. The circuitry and/or method of applying a gate-to-source voltage to a MOSFET as described here in relation to FIG. 5 may be utilized as desired in every instance in which a MOSFET is being turned on or off to have gradual transitions.

Thus a receiver has been described that operates using a scalable gain and attenuation selection logic that allows multiple receive gain/attenuation levels in a receive mode to provide good linearity. In addition the receiver operates reliably when fabricated using low voltage CMOS manufacturing processes to support the assertion of gain or attenuation while consuming a minimal amount of current and power. All components except the antenna can be implemented cheaply on a single integrated circuit using available low voltage CMOS manufacturing processes.

The above-disclosed subject matter is to be considered illustrative, and not restrictive, and the appended claims are intended to cover all such modifications, enhancements, and other embodiments that fall within the true scope of the claims. For example, a receiver can be built according to the principles described above for an arbitrary number N of different gain/attenuation levels to compensate for large ranges of input signal strength, in which N is an integer greater than or equal to 2. The alternative forms of the receive can have impedances to define filtering and gain levels that vary according to the supported power levels and can be implemented using capacitors and inductors fabricated on a single integrated circuit die, or with two die using integrated passive device techniques and mounted in the same integrated circuit package. The switching elements, resistive and capacitive elements, LNAs, mixers, and other active circuit components can be made using different transistor types, such as N-channel MOS transistors, P-channel MOS transistors, or various combinations of the two.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver comprising:
   a passive gain stage having an input to receive an in-going radio frequency (RF) signal and a gain control signal to produce a gain adjusted in-going RF signal;
   a sliced LNA stage comprising a plurality of low noise amplifiers (LNAs) coupled to receive the gain adjusted in-going RF signal, each LNA further including an adjustable source degeneration circuit wherein each LNA further includes a port for receiving a plurality of gain selection signals and an output port to produce an amplified in-going RF signal;
   a mixer comprising an input coupled to receive at least one of the amplified in-going RF signals produced by the sliced LNA stage, wherein the mixer is configured to produce a converted signal at another frequency; and
   a programmable gain amplifier (PGA) coupled to receive the converted signal and configured to produce an amplified in-going signal;
   wherein said passive gain stage comprises:
   a first node, a second node, a third node, and a fourth node;
   a first impedance element coupled between said first and second nodes;
   a second impedance element coupled between said first and third nodes;
   a third impedance element coupled between said second and fourth nodes;
   a fourth impedance element coupled between said third and fourth nodes; and
   an attenuation circuit coupled between said third and fourth nodes and in parallel to said fourth impedance element wherein the attenuation circuit is further configured to selectively attenuate a signal presented on the third and fourth nodes based on the gain control signal.

2. The receiver of claim 1, wherein said first, second, and third impedance elements comprise capacitors, and said fourth impedance element comprises an inductor.

3. The receiver of claim 1, wherein said impedance elements of said passive gain stage are configured to resonate at a resonant frequency of the in-going RF signal to produce gain for the in-going RF signal at said resonant frequency and wherein said attenuation circuit is configured to attenuate the in-going RF signal according to a plurality of gain steps based on the gain control signal.

4. The receiver of claim 3, wherein the attenuation circuit comprises a plurality of selectable resistive elements.

5. The receiver of claim 4 further including a passive gain attenuator and gain control block configured to produce the gain control signal to the selectable resistive elements of the attenuation circuit of the passive gain stage.

6. The receiver of claim 5 wherein the plurality of selectable resistive elements are coupled in parallel.

7. The receiver of claim 5, wherein the attenuation circuit comprises a plurality of selectable resistors that are sized to, when activated, attenuate the in-going RF signal by 2 decibels (dB).

8. The receiver of claim 1 wherein at least one LNA of the sliced LNA stage includes a plurality of resistive elements coupled between an amplification element and circuit common wherein at least one resistive element is selectable.

9. The receiver of claim 1 wherein at least one LNA of the sliced LNA stage includes:
   a first MOSFET device having a gate, a drain and a source terminal;
   first, second and third resistive elements, each further including first and second terminals; and
   wherein the first terminal of the first resistive element is coupled to the source terminal of the first MOSFET device, the second terminal of the first resistive element is coupled to the first terminal of the second resistive element, the second terminal of the second resistive element is coupled to the first terminal of the third resistive element, and the second terminal of the third resistive element is coupled to circuit common.

10. The receiver of claim 9 further including a second MOSFET device having a gate, a drain and a source terminal and fourth, fifth and sixth resistive elements, each further including first and second terminals, wherein the first terminal of the fourth resistive element is coupled to the source terminal of the second MOSFET device, the second terminal of the fourth resistive element is coupled to the first terminal of the fifth resistive element, the second terminal of the fifth resistive element is coupled to the first terminal of the sixth resistive element, and the second terminal of the sixth resistive element is coupled to circuit common.

11. The receiver of claim 10 further including:
first selectable switch circuitry coupled between the first terminals of the first and fourth resistive elements;
second selectable switch circuitry coupled between the first terminals of the second and fifth resistive elements; and
third selectable switch circuitry coupled between the first terminals of the third and sixth resistive elements.

12. The receiver of claim 11 further including amplifier selection circuitry coupled between a pair of amplifier outputs and the drain terminals of the first and second MOSFET devices wherein, in a first mode, the selection circuitry is configured to produce a differential output by producing signals from the drain terminals of the first and second MOSFET devices and, in a second mode, to couple the drain terminals of the first and second MOSFET to circuit common.

13. The receiver of claim 12 further including first and second load resistors having first terminals coupled through the amplifier selection circuitry to the drain terminals of the first and second MOSFET devices, respectively, and second terminals for receiving an adjustable voltage, wherein the adjustable voltage is adjusted in response to a gain of the sliced LNA stage to maintain a common-mode voltage independent of the gain of the sliced LNA stage.

14. The receiver of claim 1, further comprising:
a transformer in a balanced/unbalanced (BALUN) configuration coupled to an antenna and the passive gain stage and producing the in-going RF signal to the passive gain stage.

15. The receiver of claim 1, wherein said first, second, and third impedance elements comprise inductors, and said fourth impedance element comprises a capacitor.

16. A receiver comprising:
a transformer in a balanced/unbalanced (BALUN) configuration that produces a differential ingoing radio frequency (RF) signal based on an in-going RF signal received at an antenna;
a passive gain stage configured to receive the differential in-going RF signal and a gain control signal to produce a gain adjusted in-going RF signal based on the gain control signal;
at least one low noise amplifier (LNA) coupled to receive the gain adjusted in-going RF signal, the at least one LNA further including an output port to produce an amplified in-going RF signal and a selectable source degeneration circuit coupled to and configured to selectively reduce current flow through the LNA;
mixer circuitry comprising an input coupled to receive the amplified in-going RF signal produced by the at least one LNA, wherein the mixer circuitry is configured to produce a down-converted signal at either an intermediate frequency (IF) or baseband frequency (BB) having in-phase and quadrature phase components; and
a programmable gain amplifier (PGA) coupled to receive the down-converted signal and configured to produce an amplified in-going signal,
wherein at least one LNA includes:
a first MOSFET device having a gate, a drain and a source terminal;
first, second and third resistive elements, each further including first and second terminals;
selectable switch circuitry configured and coupled to the first terminal of at least one of the first, second and third resistive elements;
amplifier selection circuitry; and
wherein:
the first terminal of the first resistive element is coupled to the source terminal, the second terminal of the first resistive element is coupled to the first terminal of the second resistive element, the second terminal of the second resistive element is coupled to the first terminal of the third resistive element, and the second terminal of the third resistive element is coupled to circuit common;
the gate terminal is connected to receive the adjusted in-going RF signal; and
the drain terminal is connected to the amplifier selection circuitry configured to select or deselect the LNA from operation.

17. The receiver of claim 16 further includes a second MOSFET device having a gate, a drain and a source terminal and fourth, fifth and sixth resistive elements, each further including first and second terminals, wherein the first terminal of the fourth resistive element is coupled to the source terminal of the second MOSFET device, the second terminal of the fourth resistive element is coupled to the first terminal of the fifth resistive element, the second terminal of the fifth resistive element is coupled to the first terminal of the sixth resistive element, and the second terminal of the sixth resistive element is coupled to circuit common.

18. The receiver of claim 17 further including:
first switching circuitry coupled between the first terminals of the first and fourth resistive elements;
second switching circuitry coupled between the first terminals of the second and fifth resistive elements; and
third switching circuitry coupled between the first terminals of the third and sixth resistive elements.

19. The receiver of claim 18 wherein the amplifier selection circuitry is coupled between the drain terminals of the first and second MOSFET devices wherein, in a first mode, the selection circuitry is configured to produce a differential output by producing signals from the drain terminals of the first and second MOSFET devices and, in a second mode, to couple the drain terminals of the first and second MOSFETs to circuit common.

20. A receiver comprising:
a passive gain stage configured to receive a differential in-going RF signal and a gain control signal to produce a gain adjusted in-going RF signal based on the gain control signal;
a sliced LNA stage comprising a plurality of low noise amplifiers (LNAs) coupled to receive the gain adjusted in-going RF signal, each LNA having an input to be selected or deselected for gain operations and wherein at least one of the plurality of LNAs includes a source degeneration circuit comprising at least one selectable resistive element;
and including an adjustable source degeneration circuit wherein each LNA further includes a port for receiving a plurality of gain selection signals and an output port to produce an amplified in-going RF signal;
mixer circuitry comprising an input coupled to receive the amplified in-going RF signal produced by the at least one LNA, wherein the mixer circuitry is configured to produce a down-converted signal at either an intermediate frequency (IF) or baseband frequency (BB) having in-phase and quadrature phase components;

a programmable gain amplifier (PGA) coupled to receive the down-converted signal and configured to produce an amplified in-going signal; and transition circuitry coupled between the input of the at least one of the plurality of LNAs and the selectable resistive element and having an impedance element coupled to a resistive element configured to receive a signal and to gradually apply the signal to the selectable resistive element.

21. A receiver comprising:

a passive gain stage having an input to receive an in-going radio frequency (RF) signal and a gain control signal to produce a gain adjusted in-going RF signal;

a sliced LNA stage comprising a plurality of low noise amplifiers (LNAs) coupled to receive the gain adjusted in-going RF signal and having an output port to produce an amplified in-going RF signal, each of the plurality of LNAs including:

a first transistor having a drain coupled to a first output of the respective LNA, a gate for receiving a positive component of the gain adjusted in-going RF signal, and a source;

a second transistor having a drain coupled to a second output of the respective LNA, a control electrode for receiving a negative component of the gain adjusted in-going RF signal, and a source;

an adjustable source degeneration circuit coupled to the sources of the first and second transistors and responsive to a plurality of gain selection signals to select an amount of source degeneration; and amplifier selection circuitry coupled between the drains of the first and second transistors and corresponding outputs of the respective LNA, wherein, in a first mode, the amplifier selection circuitry is configured to produce a differential output by producing signals from the drains of the first and second transistors;

a mixer comprising an input coupled to receive at least one of the amplified in-going RF signals produced by the sliced LNA stage, wherein the mixer is configured to produce a converted signal at another frequency; and a programmable gain amplifier (PGA) coupled to receive the converted signal and configured to produce an amplified in-going signal.

22. The receiver of claim 21 wherein each of said first and second transistors comprise MOSFET devices.

23. The receiver of claim 21 wherein the adjustable source degeneration circuit comprises:

a first resistive element having a first terminal coupled to the source of the first transistor, and a second terminal;

a second resistive element having a first terminal coupled to said second terminal of said first resistive element, and a second terminal;

a third resistive element having a first terminal coupled to said second terminal of said second resistive element, and a second terminal coupled to circuit common;

a fourth resistive element having a first terminal coupled to the source of the second transistor, and a second terminal;

a fifth resistive element having a first terminal coupled to said second terminal of said fourth resistive element, and a second terminal;

a sixth resistive element having a first terminal coupled to said second terminal of said fifth resistive element, and a second terminal coupled to circuit common;

a first switch having a first terminal coupled to said first terminal of the first resistive element, a control terminal for receiving a first gain select signal, and a second terminal coupled to said first terminal of said fourth resistive element;

a second switch having a first terminal coupled to said first terminal of the second resistive element, a control terminal for receiving a second gain select signal, and a second terminal coupled to said first terminal of said fifth resistive element; and a third switch having a first terminal coupled to said first terminal of the third resistive element, a control terminal for receiving a third gain select signal, and a second terminal coupled to said first terminal of said sixth resistive element.

24. The receiver of claim 21 wherein in a second mode, the amplifier selection circuitry is configured to couple the drains of the first and second transistors to circuit common.

* * * * *